(12) United States Patent
Tai et al.

(10) Patent No.: US 10,971,279 B2
(45) Date of Patent: Apr. 6, 2021

(54) MANUFACTURING METHOD OF HIGH THERMAL CONDUCTIVE HYBRID FILM

(71) Applicant: NATIONAL TSING HUA UNIVERSITY, Hsinchu (TW)

(72) Inventors: Nyan-Hwa Tai, Hsinchu (TW); Hui-Ching Yuan, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 219 days.

(21) Appl. No.: 16/133,721

(22) Filed: Sep. 18, 2018

(65) Prior Publication Data

US 2019/0371484 A1 Dec. 5, 2019

(30) Foreign Application Priority Data

May 29, 2018 (TW) .................................. 107118345

(51) Int. Cl.
*B32B 9/00* (2006.01)
*H01B 1/04* (2006.01)
(Continued)

(52) U.S. Cl.
CPC .............. *H01B 1/04* (2013.01); *C01B 32/194* (2017.08); *C01B 32/198* (2017.08); *B82Y 30/00* (2013.01);
(Continued)

(58) Field of Classification Search
CPC .................................. H01B 1/04; Y10T 428/30
(Continued)

(56) References Cited

U.S. PATENT DOCUMENTS

| 2006/0121279 A1* | 6/2006 | Petrik | B82Y 40/00 428/403 |
| 2011/0284805 A1* | 11/2011 | Samulski | H01B 1/24 252/503 |

(Continued)

FOREIGN PATENT DOCUMENTS

| CN | 103303901 B | 2/2016 |
| CN | 103261563 B | 4/2016 |

OTHER PUBLICATIONS

Chien-Te Hsieh et al., "Thermal conductivity from hierarchical heat sinks using carbon nanotubes and graphene nanosheets", Nanoscale, published on Nov. 28, 2015, vol. 7, issue 44, pp. 18663-18670, published by Royal Society of Chemistry, United Kingdom.

*Primary Examiner* — Daniel H Miller
(74) *Attorney, Agent, or Firm* — CKC & Partners Co., LLC (57) ABSTRACT

A manufacturing method of a high thermal conductive hybrid film includes steps as follows. A graphene oxide solution including a plurality of graphene oxides is prepared. A nano-particle solution including a plurality of nano initial hybrid structures is prepared. A mixing process is provided, wherein the mixing process is for mixing the graphene oxide solution and the nano-particle solution to obtain a mixing solution. A preliminary-film forming process is provided, wherein the preliminary-film forming process is for filtrating the mixing solution and then remaining a mixture of the graphene oxides and the nano initial hybrid structures to form a preliminary film. A heating process is provided, wherein the heating process is for heating the preliminary-film to reduce the graphene oxides as a plurality of reduced graphene oxides and convert the nano initial hybrid structures into a plurality of nano hybrid structures.

3 Claims, 13 Drawing Sheets

(51) Int. Cl.
*C01B 32/194* (2017.01)
*C01B 32/198* (2017.01)
*B82Y 30/00* (2011.01)

(52) U.S. Cl.
CPC ...... *C01B 2204/24* (2013.01); *C01P 2004/03* (2013.01); *C01P 2004/04* (2013.01)

(58) Field of Classification Search
USPC .................. 428/408; 423/447.1; 165/185
See application file for complete search history.

(56) References Cited

U.S. PATENT DOCUMENTS

| | | | | |
|---|---|---|---|---|
| 2012/0107590 A1* | 5/2012 | Xu | ................ | C01B 32/198 428/220 |
| 2014/0124176 A1* | 5/2014 | Zhamu | ................ | F28F 21/02 165/133 |

* cited by examiner

MANUFACTURING METHOD OF HIGH THERMAL CONDUCTIVE HYBRID FILM

RELATED APPLICATIONS

This application claims priority to Taiwan Application Serial Number 107118345, filed May 29, 2018, which is herein incorporated by reference.

BACKGROUND

Technical Field

The present disclosure relates to a high thermal conductive hybrid film and a manufacturing method thereof. More particularly, the present disclosure relates to a high thermal conductive hybrid film with a graphene and a manufacturing method thereof.

Description of Related Art

The progress of the semiconductor process technology and the demand for the high power which lead to the trend of miniaturization, lightweight and high speed of electronic components. However, the thermal failure of electronic components caused by the generation and the residual of the excessive waste heat results in the decrease and the loss of the efficiency. Therefore, the improvement of heat dissipation technology for the 3C industry (computer, communication and consumer electronic) is an important issue.

Graphene is composed of $sp^2$ hybrid orbital, and the hexagonal honeycomb lattice is formed by using a bonds as skeletons, and $\pi$ bonds are formed below the planar structure by delocalized $\pi$ electrons. Therefore, graphene has great mechanical strength and optical properties. Furthermore, graphene also has excellent performances for the conductivity and the thermal conductivity, so as to arisen the trends for research of graphene nanomaterials and graphene is used as heat-dissipating coatings, heat-dissipating fins or thermal interface materials to enhance the heat-dissipating efficiency of electronic components.

However, the bonding of graphene in the through-plane and the in-plane is very different, so that the performance of graphene in the thermal conductivity is also quite different. Furthermore, the in-plane thermal conductivity of graphene is greater than the through-plane thermal conductivity of graphene, which also limits the application of graphene.

Therefore, how to effectively improve the through-plane thermal conductivity of graphene so as to produce the high thermal conductive hybrid film with the high through-plane thermal conductivity is the goal of the relevant industry.

SUMMARY

According to one aspect of the present disclosure, a high thermal conductive hybrid film is provided. The high thermal conductive hybrid film includes a plurality of reduced graphene oxides and a plurality of nano hybrid structures. The nano hybrid structures are mixed with the reduced graphene oxides. Each of the nano hybrid structures includes a nanodiamond and a carbon layer coating the nanodiamond.

According to another aspect of the present disclosure, a manufacturing method of a high thermal conductive hybrid film includes steps as follows. A graphene oxide solution is prepared, wherein the graphene oxide solution includes a plurality of graphene oxides. A nano-particle solution is prepared, wherein the nano-particle solution includes a plurality of nano initial hybrid structures, and each of the nano initial hybrid structures includes a nanodiamond and a polydopamine layer coating the nanodiamond. A mixing process is provided, wherein the mixing process is for mixing the graphene oxide solution and the nano-particle solution to obtain a mixing solution. A preliminary-film forming process is provided, wherein the preliminary-film forming process is for filtrating the mixing solution and then remaining a mixture of the graphene oxides and the nano initial hybrid structures to form a preliminary film. A heating process is provided, wherein the heating process is for heating the preliminary-film to reduce the graphene oxides as a plurality of reduced graphene oxides and convert the polydopamine layers into a plurality of carbon layers, so as to convert the nano initial hybrid structures into a plurality of nano hybrid structures. Whereby, the high thermal conductive hybrid film is formed.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
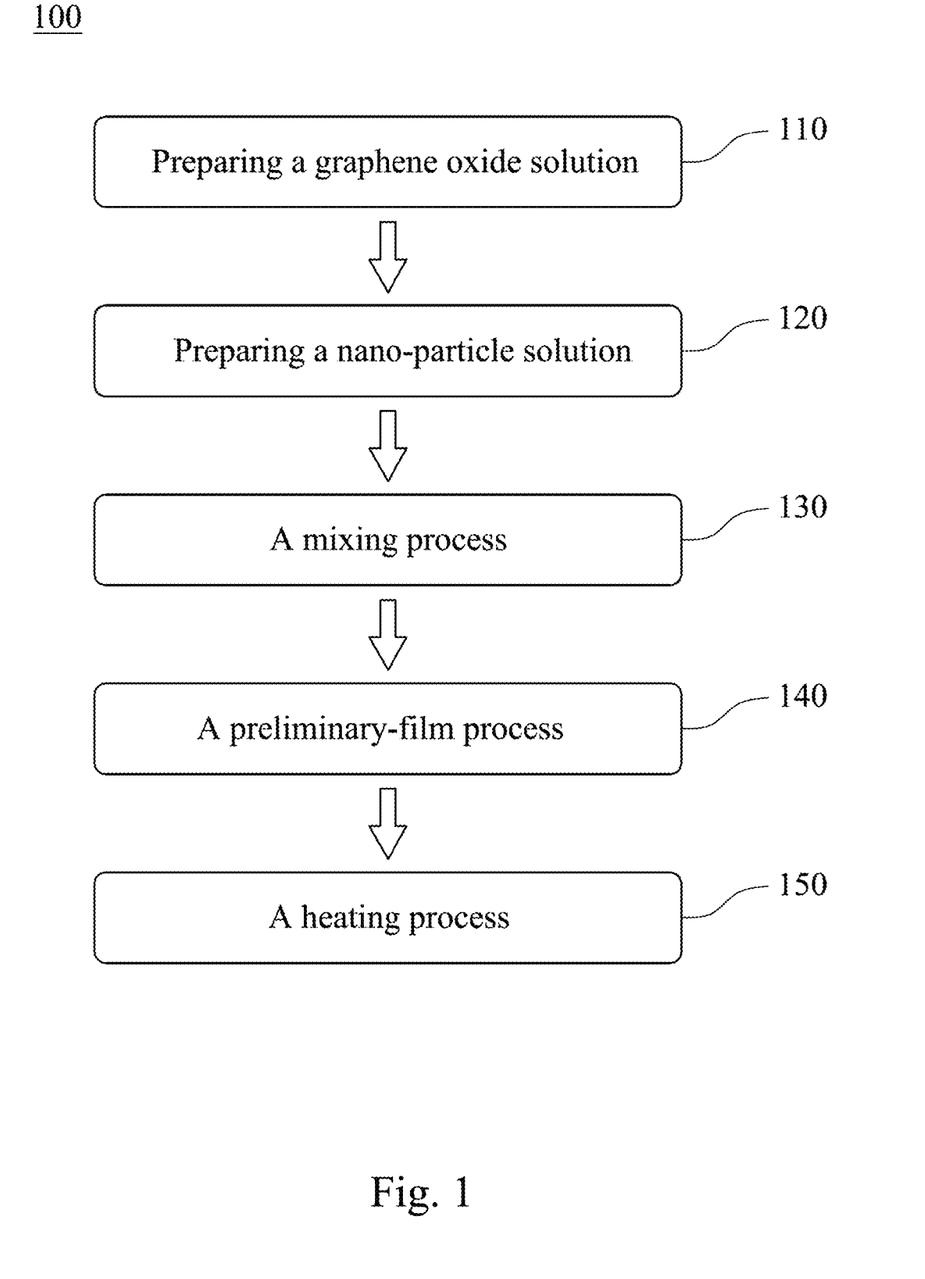
FIG. 1 is a flow chart of a manufacturing method according to one embodiment of the present disclosure.

Please refer to FIG. 1, FIGS. 2A, 2B, 2C and 2D. FIG. 1 is a flow chart of a manufacturing method 100 according to one embodiment of the present disclosure. FIGS. 2A, 2B, 2C and 2D are process diagrams of the manufacturing method 100 as shown in FIG. 1, respectively. The manufacturing method 100 is for preparing a high thermal conductive hybrid film 200, and the manufacturing method 100 includes a step 110, a step 120, a step 130, a step 140 and a step 150.

In the step 110, a graphene oxide solution 300 is prepared, and the graphene oxide solution 300 includes a plurality of graphene oxides 310.

In the step 120, a nano-particle solution 400 is prepared, and the nano-particle solution 400 includes a plurality of nano initial hybrid structures 410. Each of the nano initial hybrid structures 410 includes a nanodiamond 412 and a polydopamine layer 411 which coats the nanodiamond 412.

In the step 130, a mixing process is provided, wherein the mixing process is for mixing the graphene oxide solution 300 and the nano-particle solution 400 to obtain a mixing solution 500.

In the step 140, a preliminary-film 600 forming process is provided, wherein the preliminary-film 600 forming process is for filtrating the mixing solution 500 and then remaining a mixture of the graphene oxides 310 and the nano initial hybrid structures 410 to form a preliminary film 600.

In the step 150, a heating process is provided, wherein the heating process is for heating the preliminary-film 600 to reduce the graphene oxides 310 as a plurality of reduced graphene oxides 230, and convert the polydopamine layer 411 into a carbon layer 211, so as to convert the nano initial hybrid structures 410 into a plurality of nano hybrid structures 210, whereby, the high thermal conductive hybrid film 200 is formed.

Figure 2A:
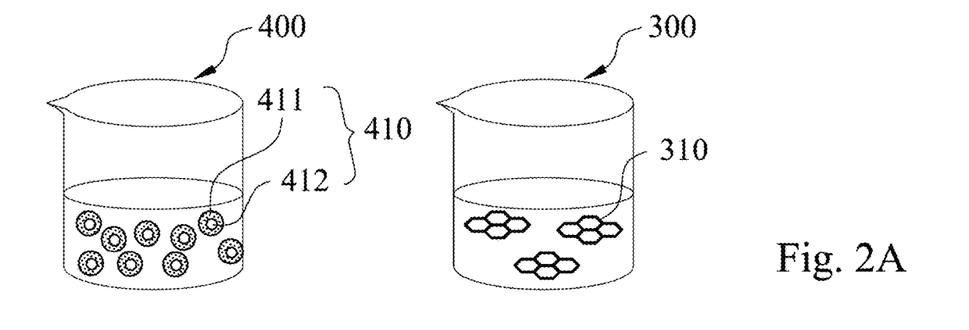
FIGS. 2A, 2B, 2C and 2D are process diagrams of the manufacturing method of FIG. 1, respectively.
Figure 2B:
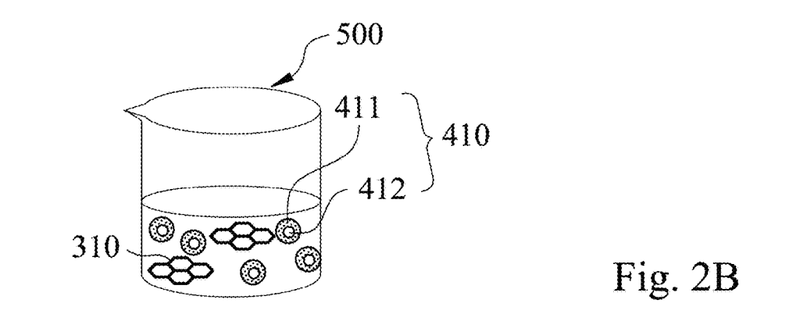
Figure 2C:
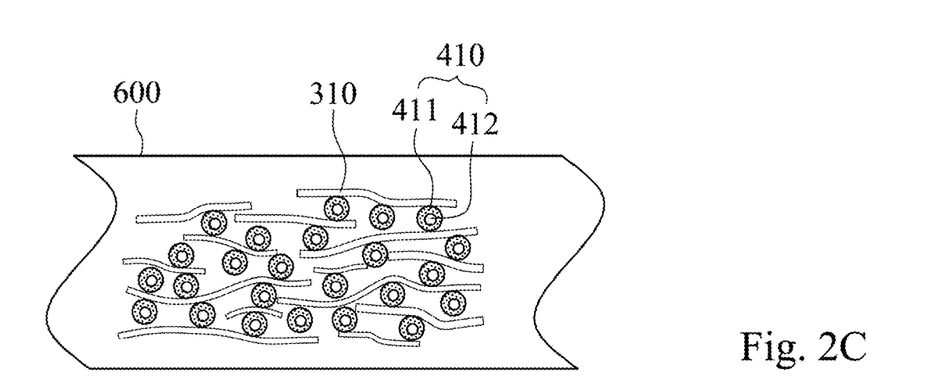
Figure 2D:
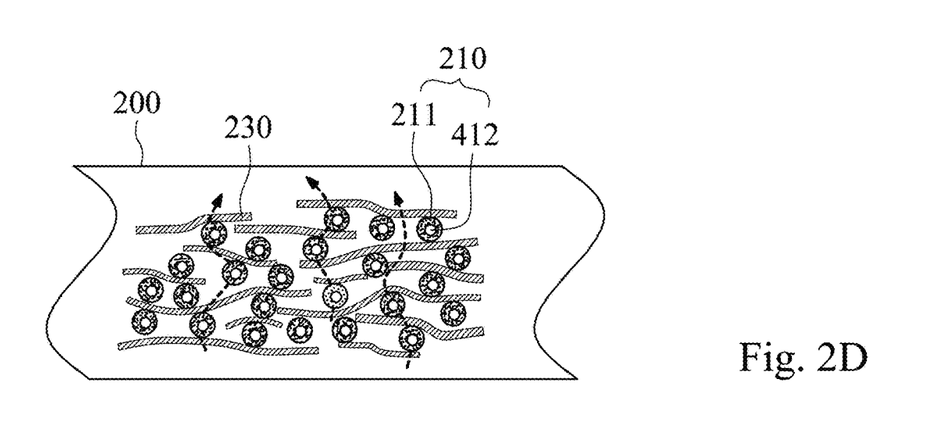

Therefore, the prepared high thermal conductive hybrid film 200 includes the reduced graphene oxides 230 and the nano hybrid structures 210. Each of the nano hybrid structures 210 is mixed with each of the reduced graphene oxides 230 including the nanodiamond 412 and the carbon layer 211, wherein the carbon layer 211 coats the nanodiamond 412. Therefore, a through-plane and an in-plane thermal conductivity of the high thermal conductive hybrid film 200 can be increased. The details of the manufacturing method 100 will be described.

In the step 110, the graphene oxides 310 can be prepared by a chemical reduction method. As shown in FIG. 2A, the graphene oxides 310 can be dispersed in the deionized water to form the graphene oxide solution 300.

In the step 120, the nanodiamonds 412 are dispersed in a tris-hydrochloride buffer to disperse the nanodiamonds 412 evenly and then mixed with a dopamine hydrochloride to form the nano initial hybrid structures 410 shown in FIG. 2A, and the nano initial hybrid structures 410 are dispersed in the ammonia to form the nano-particle solution 400. When the nano initial hybrid structures 410 are dispersed in the ammonia, a great dispersing effect can be attained.

In the step 130, first, the graphene oxide solution 300 is oscillated by an ultrasonicator so that the layer is stripped and dispersed evenly. As shown in FIG. 2B, the graphene oxide solution 300 is mixed with the nano-particle solution 400 to form the mixing solution 500 by using a magnetic stirrer. A dispersion of the nano initial hybrid structures 410 in the mixing solution 500 with the graphene oxide 310 can be enhanced by a surface functional group of the polydopamine layer 411.

In the step 140, the mixture of the graphene oxides 310 and the nano initial hybrid structures 410 is pressurized and dried in air to form the preliminary-film 600. The liquid of the mixing solution 500 is drained by a vacuum filtration, and then retained the mixture of the graphene oxides 310 and the nano initial hybrid structures 410 after the vacuum filtration, which is pressurized and dried in air to form the preliminary-film 600. As shown in FIG. 2C, the preliminary-film 600 includes the graphene oxides 310 and the nano initial hybrid structures 410, and then the graphene oxides 310 and the nano initial hybrid structures 410 are mixed each other.

In the step 150, the preliminary film 600 can be disposed in a high-temperature furnace (not shown) with argon (not shown) flowing at 800° C. to anneal, so as to form the high thermal conductive hybrid film 200. An oxidized functional of the graphene oxides 310 is removed to reduce the graphene oxides 310 as the reduced graphene oxides 230 by annealing, and produced a partial re-stacking effect at the same time. Therefore, the reduced graphene oxides 230 have a different interlamellar spacing and a large half width at peak in the x-ray diffraction pattern analysis. Furthermore, the polydopamine layer 411 can be carbonized to form the carbon layer 211 by annealing, and the nano initial hybrid structures 210 have the carbon layers 211 which are coating the nanodiamond 412. As shown in FIG. 2D, the high thermal conductive hybrid film 200 includes the reduced graphene oxides 230 and the nano hybrid structures 210, and then the nano hybrid structures 210 are mixed with the reduced graphene oxides 230. More specifically, the reduced graphene oxides 230 are layered stacked into a plurality of graphene layers (not shown), and the nano hybrid structures 210 are mixed between the graphene layers, as shown a dash arrow in FIG. 2D, and it can contribute to a through-plane heat transfer. Therefore, preferably, the through-plane thermal conductivity of the high thermal conductive hybrid film 200 can be greater than or equal to 0.5 W/m·K.

Examples

Figure 3A:
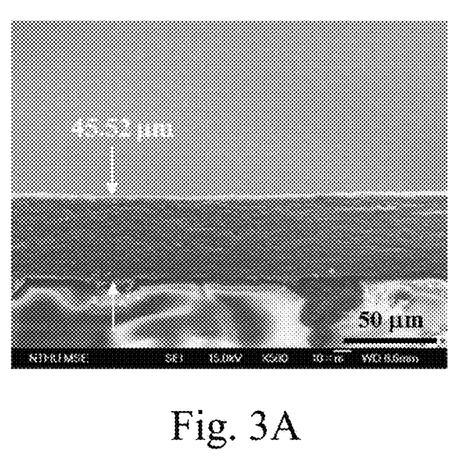
FIG. 3A is a cross-sectional view of a FESEM (Field Emission Scanning Electron Microscopy) image for the preliminary-film according to a first example of the present disclosure.
Figure 3B:
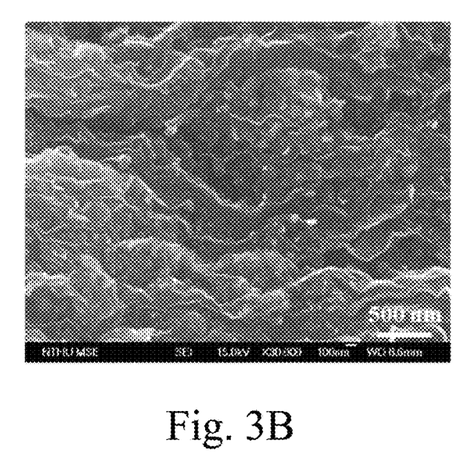
FIG. 3B is a cross-sectional view of a FESEM image for the preliminary-film at a high magnification according to the first example of the present disclosure.
Figure 3C:
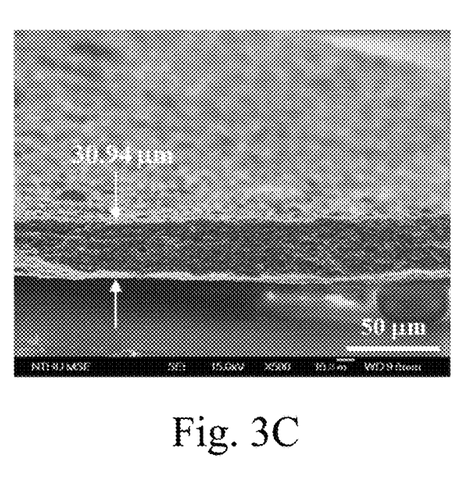
FIG. 3C is a cross-sectional view of a FESEM image for the high thermal conductive hybrid film according to the first example of the present disclosure.
Figure 3D:
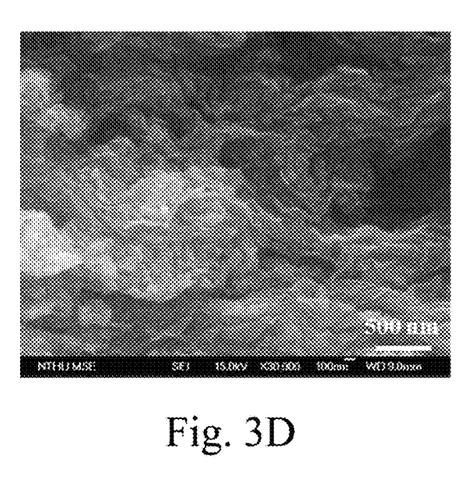
FIG. 3D is a cross-sectional view of a FESEM image for the high thermal conductive hybrid film at the high magnification according to the first example of the present disclosure.

Please refer to FIGS. 3A, 3B, 3C and 3D. FIG. 3A is a cross-sectional view of a FESEM (Field Emission Scanning Electron Microscopy) image for the preliminary-film according to a first example of the present disclosure. FIG. 3B is a cross-sectional view of a FESEM image for the preliminary-film at a high magnification according to the first example of the present disclosure. FIG. 3C is a cross-sectional view of a FESEM image for the high thermal conductive hybrid film according to the first example of the present disclosure. FIG. 3D is a cross-sectional view of a FESEM image for the high thermal conductive hybrid film at the high magnification according to the first example of the present disclosure. The cross-sectional views of the FESEM image of FIGS. 3A to 3D are obtained by Field Emission Scanning Electron Microscope (JEOL JSM 6500F).

In the first example, the graphene oxide is prepared by the Modified Hummers method. When the graphene oxide solution is prepared, 1 g of the natural graphite flakes (325 mesh) are added in 100 mL of the concentrated sulfuric acid ($H_2SO_4$) and stirred for 1 hour in an ice bath to intercalate the graphite. 4 g of the potassium permanganate ($KMnO_4$) is added as a strong oxidant and stirred for 6 hours in a water bath at 40° C. to continue the oxidation reaction, then 50 mL of the deionized water is added slowly and stirred for 1 hour. The heat energy released by diluting the concentrated sulfuric acid can heat the solution evenly to open the weak bonding between the graphite, hence the step should experiment slowly to avoid the destruction of the oxidized functional groups which are caused by the temperature increasing rapidly. Then 100 mL of the deionized water is added slowly and stirred for 30 minutes to intercalate the graphite completely. Finally, the reaction is terminated with 40 mL of the 35% hydrogen peroxide ($H_2O_2$). The solution will be stratified after standing overnight. After the supernatant is poured out, 200 mL of the 5% hydrochloric acid (HCl) is added, and the solution is stirred for 10 minutes to remove the metal ions and the impurities in the solution. The solution is dispensed into the 6 centrifuge tubes and centrifuged at 5000 rpm for 30 minutes. The supernatant is poured out and then the deionized water is added, the solution is centrifuged repeatedly at the same rotation speed and time until the solution is reached to neutral, and the graphene oxide solution with the concentration of 8 mg/mL can be obtained.

When the nano-particle solution is prepared, 20 mg of the nanodiamond is added in the tris-hydrochloride buffer to maintain the acidity and alkalinity of the solution, and a pH value of the buffer is 8.5. The solution is dispersed evenly by the ultrasonicator for 1 hour, and an equal proportion of the dopamine hydrochloride (DA) is added, wherein a weight ratio of the nanodiamond, the deionized water and the dopamine hydrochloride is 1:1:1, and the solution is stirred for 18 hours by using the magnetic stirrer, so that the dopamine hydrochloride is auto-polymerized to form the polydopamine layer on the surface of the nanodiamond. Then, the remaining dopamine solution is removed by using a centrifugation to obtain the nano initial hybrid structure which has the polydopamine layer coating the nanodiamond, and the nano initial hybrid structure is dispersed in the ammonia to complete the preparation of the nano-particle solution.

In the mixing process, the graphene oxide solution with 20 mg of the graphene oxides is oscillated by the ultrasonicator for 1 hour, so that the layer is stripped and dispersed evenly. Then, the nano-particle solution is mixed fully with the graphene oxide solution by using the magnetic stirrer. After the step is continued for 1 hours, the mixing solution can be obtained.

In the preliminary-film forming process, the liquid of the mixing solution is drained by the vacuum filtration, and then retained the mixture of the graphene oxides and nano initial hybrid structures is pressurized and dried in air to form the preliminary-film which has a diameter is 35 mm.

In the heating process, the preliminary-film is cutted into a circular test piece which has a diameter is 25.5 mm, and then the preliminary-film is sandwiched between the two quartzs and disposed in the high-temperature furnace for the thermal reduction reaction. Argon is flowed at 200 sccm (standard cubic centimeter per minute), and heat the test piece to 100° C. at a heating rate of 10° C. per minute. The moisture of the test piece is removed at 100° C. for 30 minutes, and the temperature is raised to 220° C. continuously for 30 minutes to remove the oxidized functional groups of the graphene oxides. And then the temperature is raised to 800° C. for 1 hour, so that the polydopamine is carbonized. Finally, the test piece is cooled to the room temperature at a cooling rate of 50° C. per minutes to obtain the high thermal conductive hybrid film.

Figure 4A:
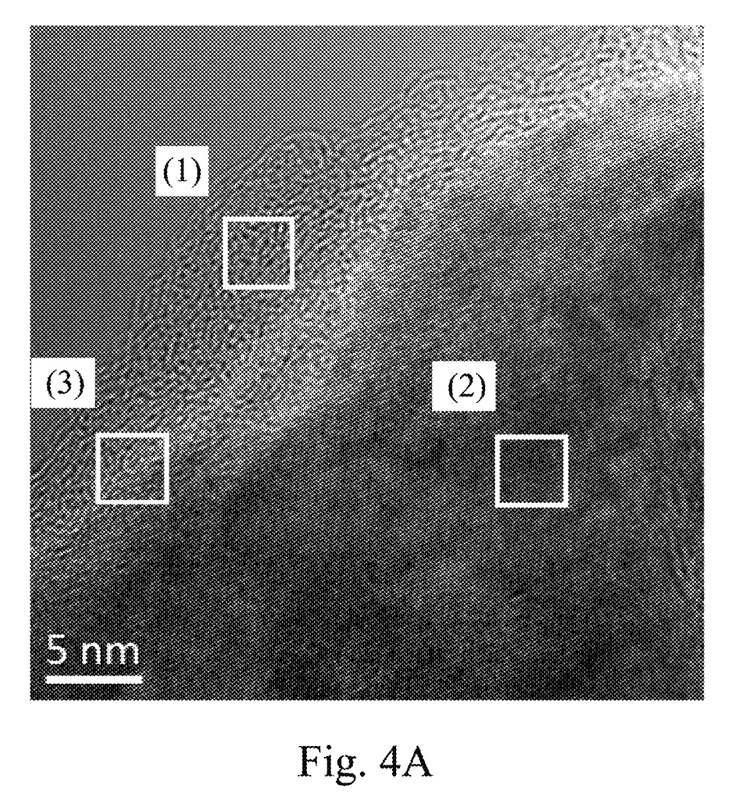
FIG. 4A is a TEM (Transmission Electron Microscope) image according to the first example of the present disclosure.
Figure 4B:
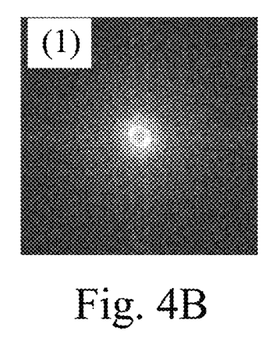
FIG. 4B is a FFT (Fast Fourier Transform) image of a region (1) of FIG. 4A.
Figure 4C:
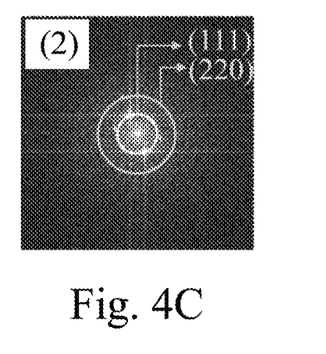
FIG. 4C is a FFT image of a region (2) of FIG. 4A.
Figure 4D:
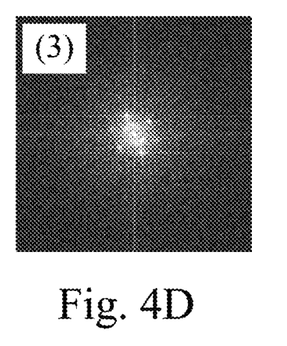
FIG. 4D is a FFT image of a region (3) of FIG. 4A.

Please refer to FIGS. 4A, 4B, 4C, and 4D. FIG. 4A is a TEM (Transmission electron microscope) image according to the first example of the present disclosure. FIG. 4B is a FFT (Fast fourier transform) image of a region (1) of FIG. 4A. FIG. 4C is a FFT image of a region (2) of FIG. 4A. FIG. 4D is a FFT image of a region (3) of FIG. 4A. The image of FIG. 4A is obtained by Transmission Electron Microscope (JEOL JEM-3000F). As shown in FIG. 4A, after the heating process, a hexagonal structure of the polydopamine can be retained to form the nanodiamond coated by the carbon layer, wherein a thickness of the carbon layer is 5 nm. Further, in the FFT image of the carbon layer of the region (1) in FIG. 4B, the image of a halation ring is shown on the diffraction pattern, and the image can be determined that the carbon layer is an amorphous carbon structure. The region (2) in FIG. 4C is the nanodiamond coated by the carbon layer, and a diffraction point in the FFT image can be relative to a (111) and a (220) crystal plane of a diamond structure respectively, indicating that a phase structure of the nanodiamond is not changed after the heating process. Furthermore, the region (3) in FIG. 4D is a boundary between the nanodiamond and the carbon layer, and then the diffraction point of the nanodiamond and an amorphous signal of the carbon layer are simultaneously shown in the FFT image obtained from the interface of the boundary.

Figure 5A:
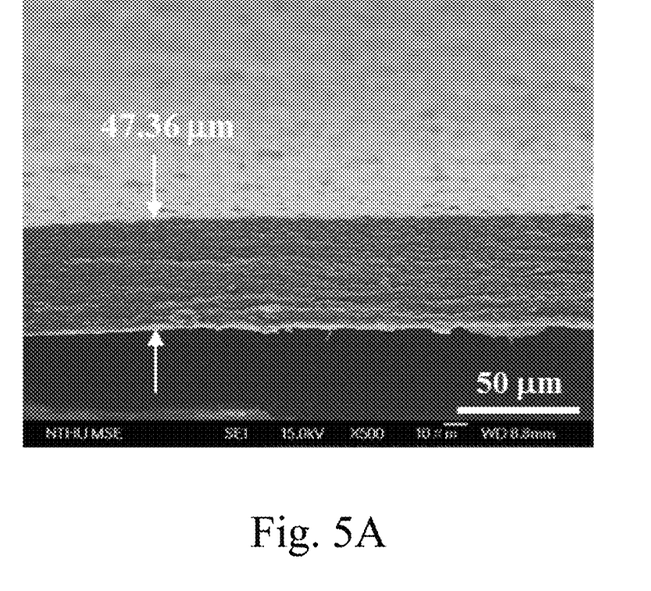
FIG. 5A is a cross-sectional view of a FESEM image for the preliminary-film according to a second example of the present disclosure.
Figure 5B:
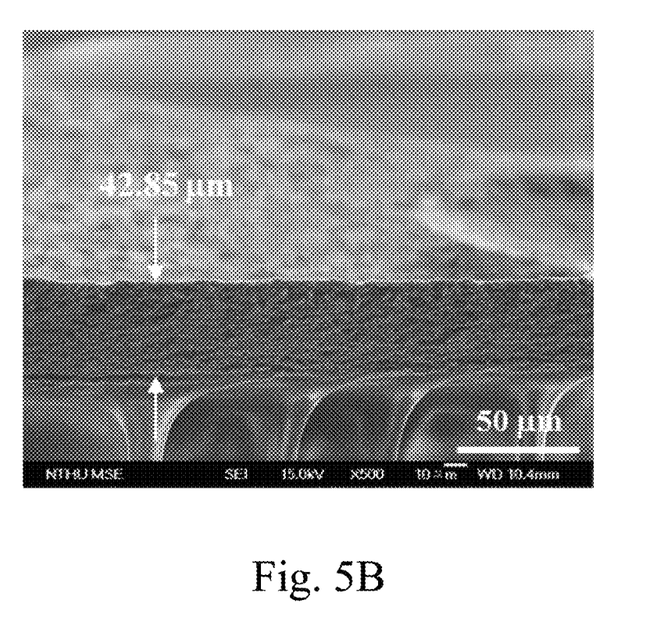
FIG. 5B is a cross-sectional view of a FESEM image for the high thermal conductive hybrid film according to the second example of the present disclosure.

Please refer to FIGS. 5A and 5B. FIG. 5A is a cross-sectional view of a FESEM image for the preliminary-film according to a second example of the present disclosure. FIG. 5B is a cross-sectional view of a FESEM image for the high thermal conductive hybrid film according to the second example of the present disclosure.

The preparation of the second example is similar to that of the first example. The different is that 40 mg of the nanodiamond is used in the preparation of the nano-particle solution.

Figure 6A:
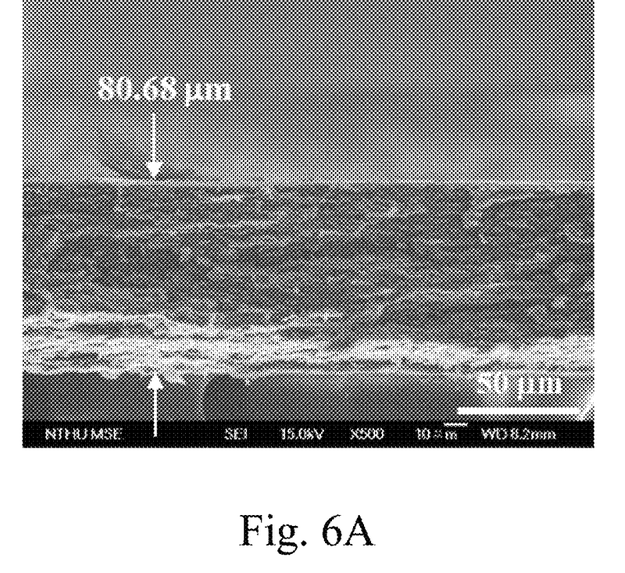
FIG. 6A is a cross-sectional view of a FESEM image for the preliminary-film according to a third example of the present disclosure.
Figure 6B:
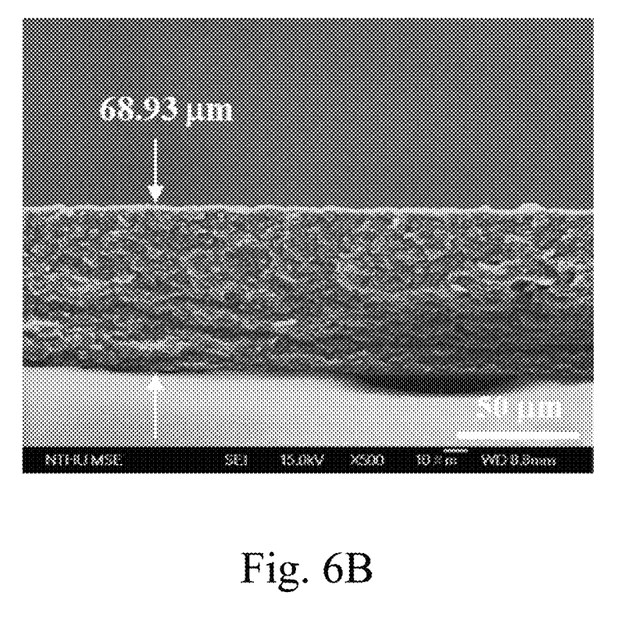
FIG. 6B is a cross-sectional view of a FESEM image for the high thermal conductive hybrid film according to the third example of the present disclosure.

Please refer to FIGS. 6A and 6B. FIG. 6A is a cross-sectional view of a FESEM image for the preliminary-film according to a third example of the present disclosure. FIG. 6B is a cross-sectional view of a FESEM image for the high thermal conductive hybrid film according to the third example of the present disclosure.

The preparation of the third example is similar to that of the first example. The different is that 60 mg of the nanodiamond is used in the preparation of the nano-particle solution.

Figure 7A:
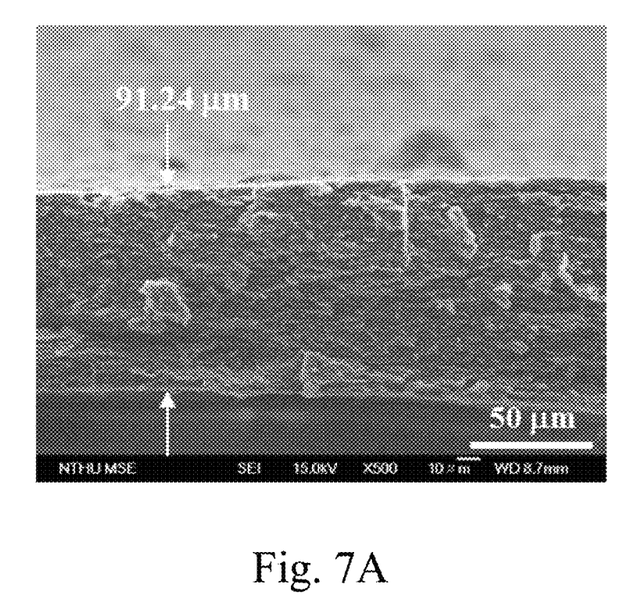
FIG. 7A is a cross-sectional view of a FESEM image for the preliminary-film according to a fourth example of the present disclosure.
Figure 7B:
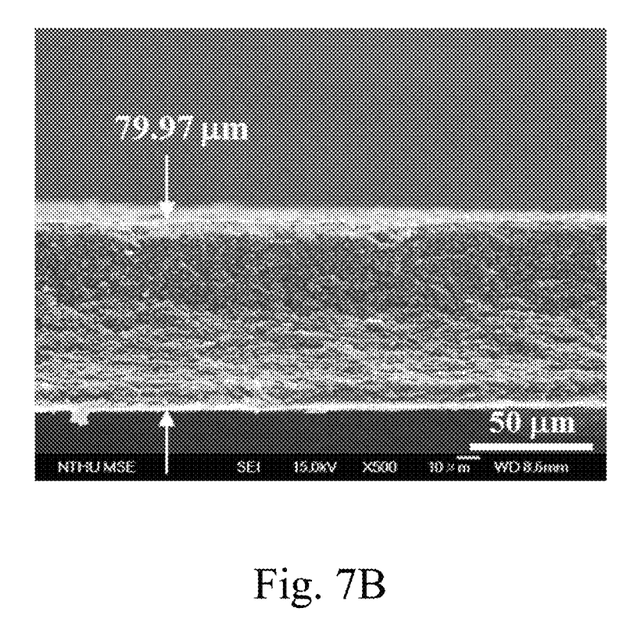
FIG. 7B is a cross-sectional view of a FESEM image for the high thermal conductive hybrid film according to the fourth example of the present disclosure.

Please refer to FIGS. 7A and 7B. FIG. 7A is a cross-sectional view of a FESEM image for the preliminary-film according to a fourth example of the present disclosure. FIG. 7B is a cross-sectional view of a FESEM image for the high thermal conductive hybrid film according to the fourth example of the present disclosure.

The preparation of the fourth example is similar to that of the first example. The different is that 80 mg of the nanodiamond is used in the preparation of the nano-particle solution.

As shown the preliminary-film in FIGS. 3A, 3B, 5A, 6A and 7A, the nano initial hybrid structure with the polydopamine layer coating nanodiamond can be placed in the graphene oxide to form the layer structure. As shown in FIGS. 3C, 3D, 5B, 6B and 7B, a interfacial bonding force between the nanodiamond and the graphene oxide can be increased since the surface functional of the polydopamine. Therefore, the high thermal conductive hybrid film is formed by the preliminary-film after the heating process can maintain the closed structure. Furthermore, because of a removal of the graphene oxide containing the oxidized functional, the reduced graphene oxide formed in rearrangement can have a closer layer structure, and the film thickness is reduced. A transfer effect of a phonon is enhanced beneficially, and the thermal conductivity is improved.

Comparative Example

Figure 8A:
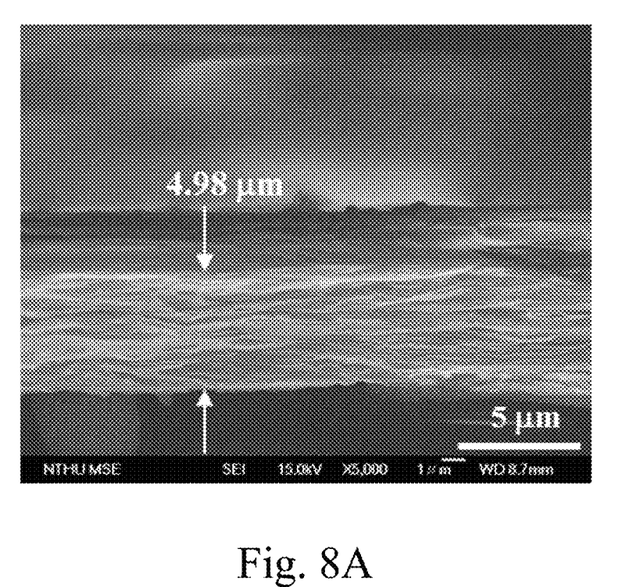
FIG. 8A is a cross-sectional view of a FESEM image for the preliminary-film according to a first comparative example of the present disclosure.
Figure 8B:
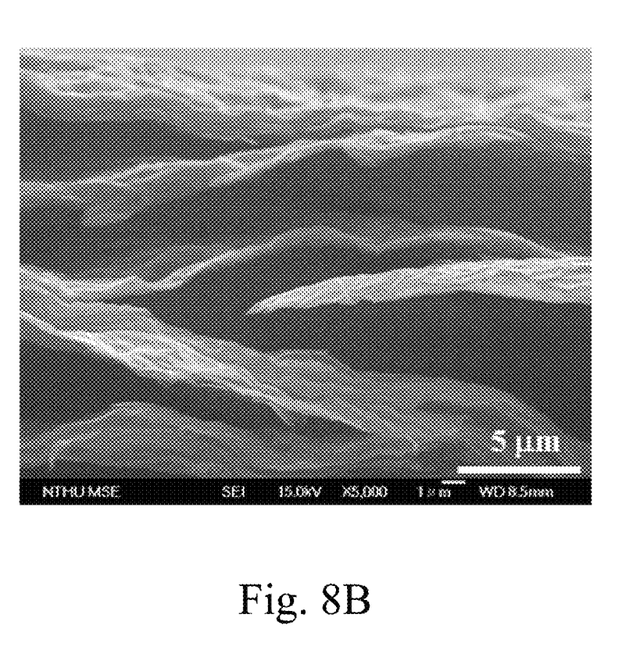
FIG. 8B is a cross-sectional view of a FESEM image for the high thermal conductive hybrid film at the high magnification according to the first comparative example of the present disclosure.

Please refer to FIGS. 8A and 8B. FIG. 8A is a cross-sectional view of a FESEM image for the preliminary-film according to a first comparative example of the present disclosure. FIG. 8B is a cross-sectional view of a FESEM image for the high thermal conductive hybrid film at the high magnification according to the first comparative example of the present disclosure.

The high thermal conductive hybrid film of the first comparative example only includes the reduced graphene oxides. First, the graphene oxide solution is prepared, and the preparation is the same as the first example. When 20 mg of the graphene oxide solution is prepared, the preliminary-film is obtained by the preliminary-film forming process which is the same as the first example is experimented directly. Finally, the high thermal conductive hybrid film is containing the reduced graphene oxides formed by the heating process.

Figure 9A:
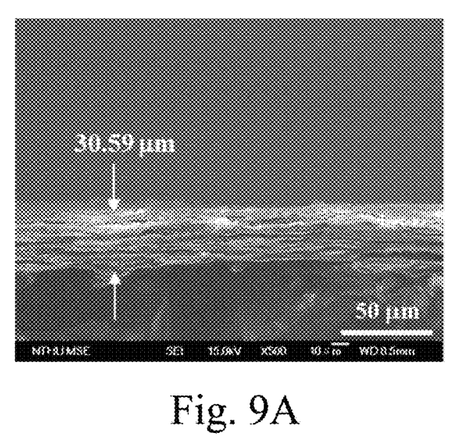
FIG. 9A is a cross-sectional view of a FESEM image for the preliminary-film according to a second comparative example of the present disclosure.
Figure 9B:
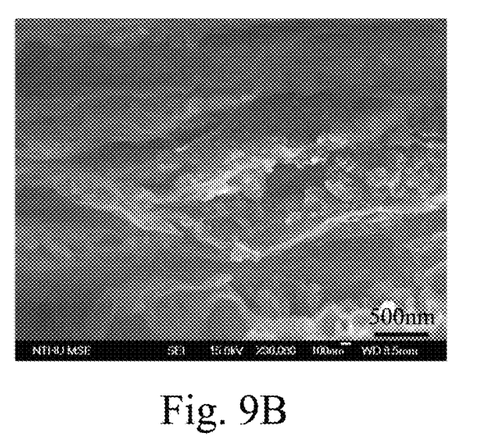
FIG. 9B is a cross-sectional view of a FESEM image for the preliminary-film at the high magnification according to the second comparative example of the present disclosure.
Figure 9C:
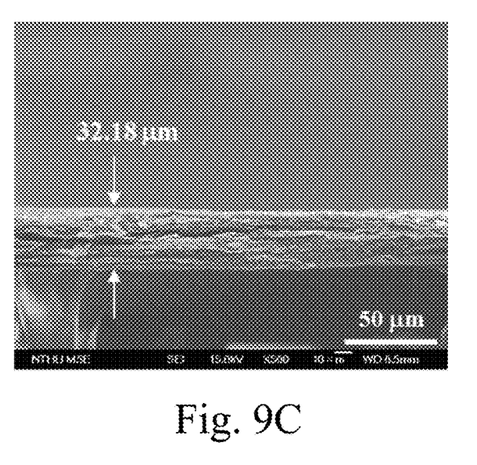
FIG. 9C is a cross-sectional view of a FESEM image for the high thermal conductive hybrid film according to the second comparative example of the present disclosure.
Figure 9D:
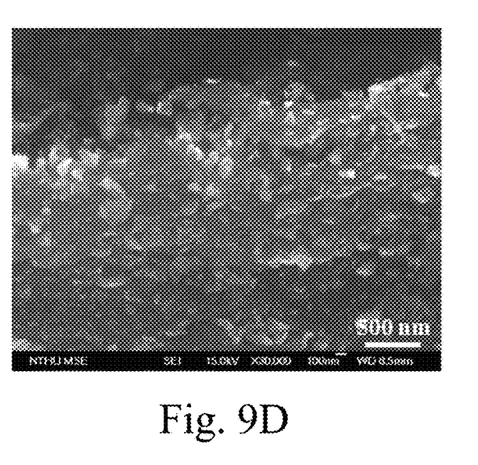
FIG. 9D is a cross-sectional view of a FESEM image for the high thermal conductive hybrid film at the high magnification according to the second comparative example of the present disclosure.

Please refer to FIGS. 9A, 9B, 9C, and 9D. FIG. 9A is a cross-sectional view of a FESEM image for the preliminary-film according to a second comparative example of the present disclosure. FIG. 9B is a cross-sectional view of a FESEM image for the preliminary-film at the high magnification according to the second comparative example of the present disclosure. FIG. 9C is a cross-sectional view of a FESEM image for the high thermal conductive hybrid film according to the second comparative example of the present disclosure. FIG. 9D is a cross-sectional view of a FESEM image for the high thermal conductive hybrid film at the high magnification according to the second comparative example of the present disclosure.

The high thermal conductive hybrid film of the second comparative example includes the reduced graphene oxides and the nanodiamonds, which are mixing each other. First, the graphene oxide solution is prepared, and the preparation is the same as the first example, and the nano-particle solution is mixed by 20 mg of the nanodiamonds and the ammonia which is prepared, and the preliminary-film is obtained by the mixing process and the preliminary-film forming process which are the same as the first example is experimented directly. Finally, the high thermal conductive hybrid film is formed by the heating process. The different between the high thermal conductive hybrid film of the second comparative example and that of the first example to the fourth example is that the nanodiamonds are not coated by the carbon layer in the second comparative example.

Figure 10:
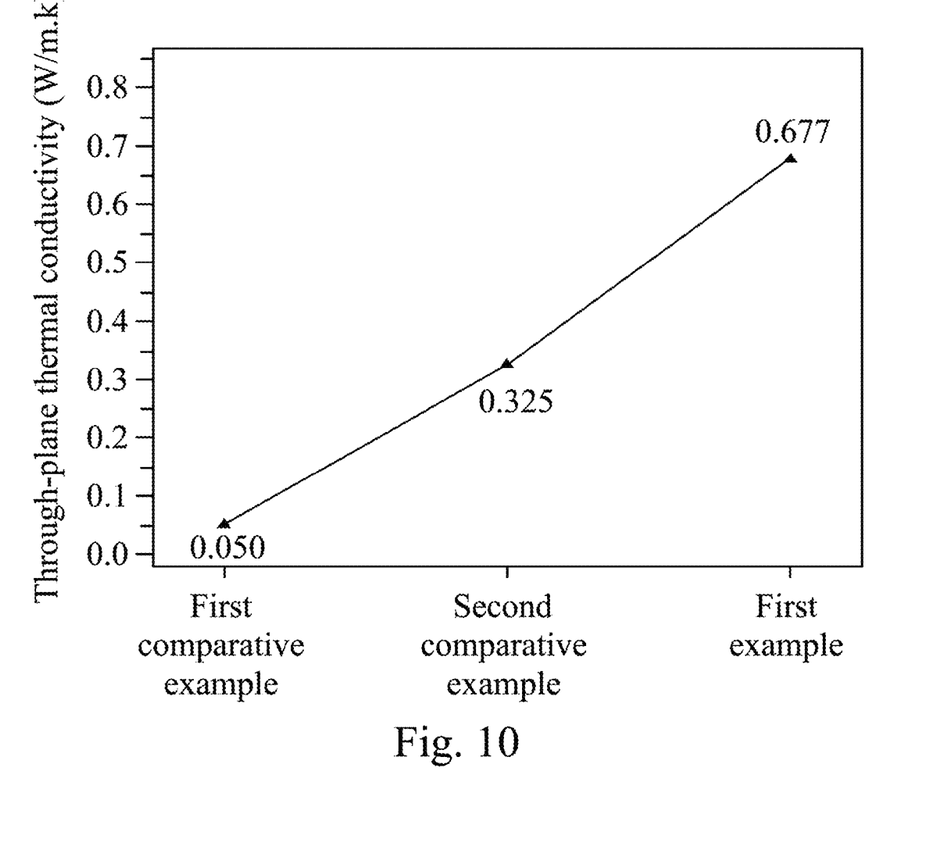
FIG. 10 is a diagram of the through-plane thermal conductivity according to the first comparative example, the second comparative example and the first example.

Please refer to FIG. 10. FIG. 10 is a diagram of the through-plane thermal conductivity according to the first comparative example, the second comparative example and the first example. The through-plane thermal conductivity as shown in FIG. 10 is obtained by calculating a thermal diffusivity and a product of a density and a ratio which are using a laser flash method at 25° C.

As shown in FIG. 10, the through-plane thermal conductivity of the high thermal conductive hybrid film of the first comparative example which includes the reduced graphene oxides is the lowest, and the through-plane thermal conductivity of the high thermal conductive hybrid film of the second comparative example including a mixture of the nanodiamonds and the reduced graphene oxides is higher than that of the first comparative. It is because that the nanodiamonds can be placed between the graphene layers to fill the pores which are formed by reducing the graphene oxides as the reduced graphene oxides at the high temperature, so that the nanodiamonds can be used as a heat transfer path between the graphene layers, and the thermal conductivity can be improved. However, as shown in FIG. 9D, the high thermal conductive hybrid film of the second comparative example still has the cracks instead of the closer structure completely.

For the high thermal conductive hybrid film of the first example, the interfacial bonding force between the nanodiamond and the graphene oxide can be increased since the surface functional of the polydopamine. Therefore, the high thermal conductive hybrid film is formed after the heating process can be shown the closed structure, at the same time, the carbon layer is formed by a carbonization of the polydopamine can be used as a bridge for the transmission of the phonons in a vertical direction so as to enhance the through-plane thermal conductivity of the high thermal conductive hybrid film. Therefore, the results indicate that the through-plane thermal conductivity of the high thermal conductive hybrid film of the present disclosure can be improved effectively.

Figure 11:
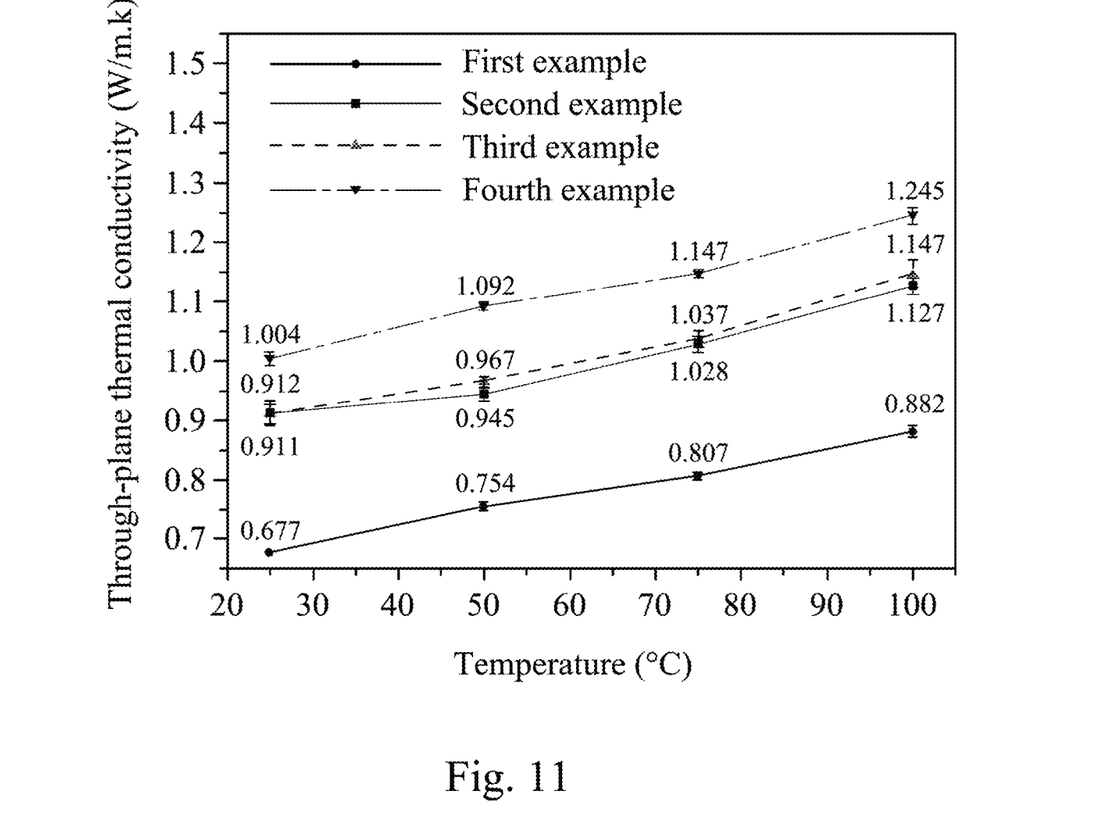
FIG. 11 is a diagram of the through-plane thermal conductivity measured at 25° C., 50° C., 75° C. and 100° C. according to the first example, the second example, the third example and the fourth example, respectively.

Please refer to FIG. 11. FIG. 11 is a diagram of the through-plane thermal conductivity measured at 25° C., 50° C., 75° C. and 100° C. according to the first example, the second example, the third example and the fourth example, respectively. The through-plane thermal conductivity of the high thermal conductive hybrid film of the first example, the second example, the third example and the fourth example are greater than 0.5 W/m·K, and have good at the different temperatures.

Figure 12:
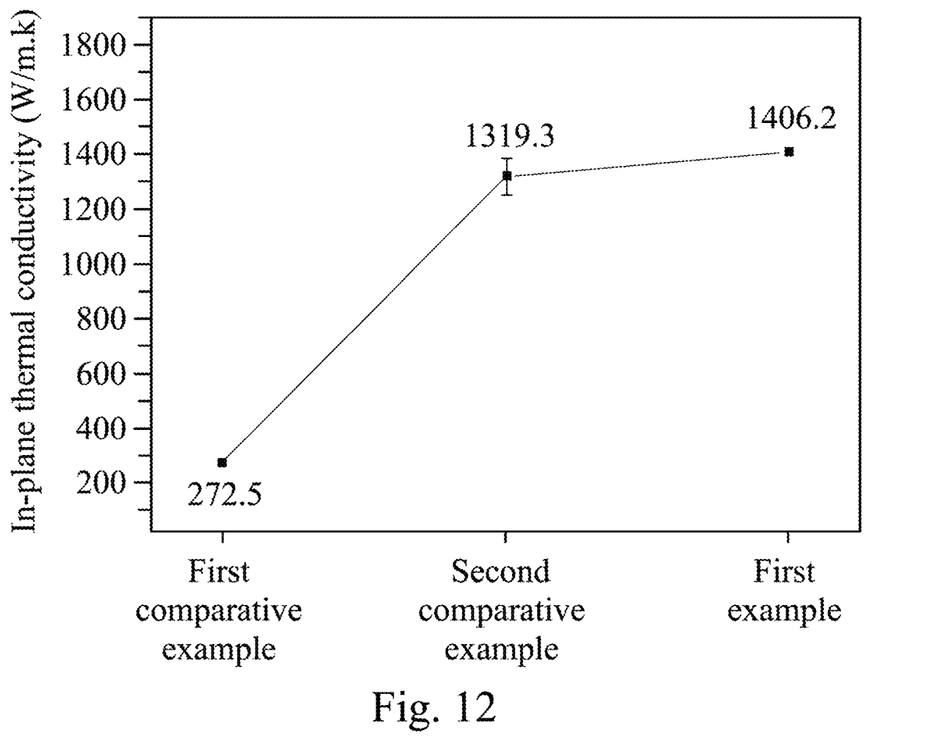
FIG. 12 is a diagram of the in-plane thermal conductivity according to the first comparative example, the second comparative example and the first example.
Figure 13:
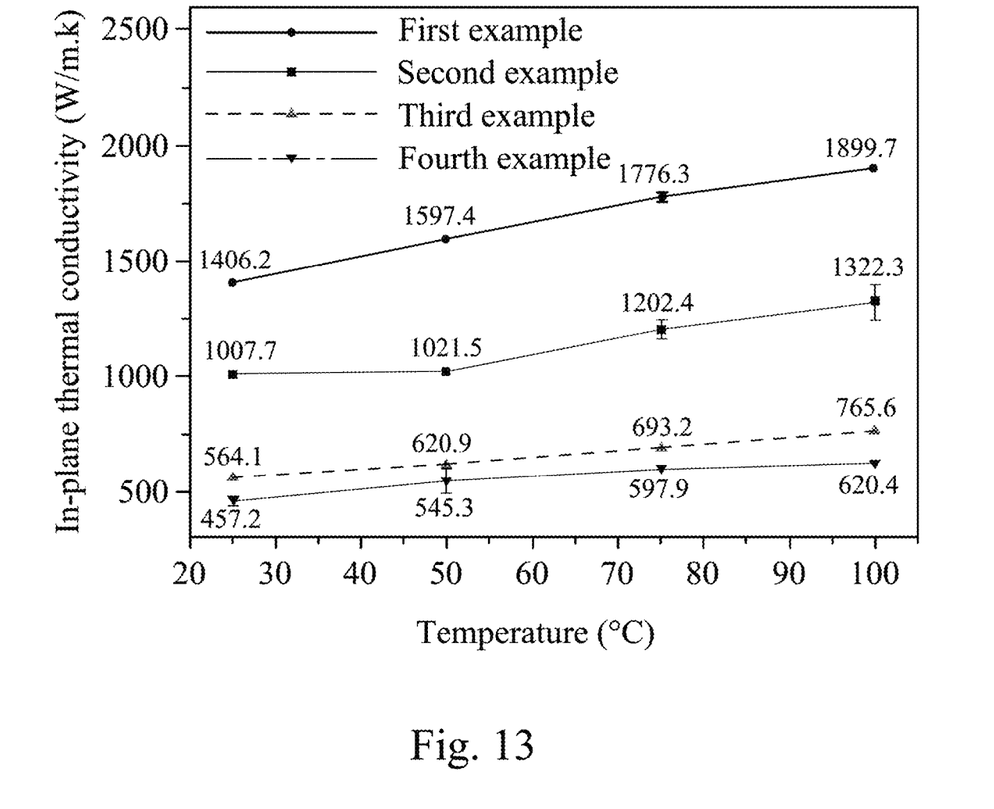
FIG. 13 is a diagram of the in-plane thermal conductivity measured at 25° C., 50° C., 75° C. and 100° C. according to the first example, the second example, the third example and the fourth example, respectively.

Please refer to FIGS. 12 and 13. FIG. 12 is a diagram of the in-plane thermal conductivity according to the first comparative example, the second comparative example and the first example. FIG. 13 is a diagram of the in-plane thermal conductivity measured at 25° C., 50° C., 75° C. and 100° C. according to the first example, the second example, the third example and the fourth example, respectively. As shown in FIG. 12, the in-plane thermal conductivity of the high thermal conductive hybrid film of the first example is greater than that of the first comparative example and the second comparative example, and have a good effect of the in-plane thermal transfer. As shown in FIG. 13, the in-plane thermal conductivity of the high thermal conductive hybrid film of the first example, the second example, the third example and the fourth example are greater than 400 W/m·K, wherein the highest value can be reached to 1406.2 W/m·K at the room temperature and up to 1899.7 W/m·K at 100° C., and the in-plane thermal conductivity is good at the different temperatures, respectively. Preferably, the in-plane thermal conductivity of the high thermal conductive hybrid film is less than or equal to 2000 W/m·K. In particular, although the in-plane thermal conductivity of the high thermal conductive hybrid film of the second example to the fourth example are lower than that of the second comparative example, it is still greater than that of the first comparative example. Therefore, the results indicates that the in-plane thermal conductivity of the high thermal conductive hybrid film of the present disclosure is greater than that of conventional technology.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A manufacturing method of a high thermal conductive hybrid film, and the manufacturing method comprising:

preparing a graphene oxide solution, wherein the graphene oxide solution comprises a plurality of graphene oxides;

preparing a nano-particle solution, wherein the nano-particle solution comprises a plurality of nano initial hybrid structures, and each of the nano initial hybrid structures comprises a nanodiamond and a polydopamine layer coating the nanodiamond, the nanodiamonds are dispersed in a tris-hydrochloride buffer to disperse the nanodiamonds evenly and then mixed with a dopamine hydrochloride to form the nano initial hybrid structures, and then the nano initial hybrid structures are dispersed in an ammonia to form the nano-particle solution;

providing a mixing process, wherein the mixing process is for mixing the graphene oxide solution and the nano-particle solution to obtain a mixing solution;

providing a preliminary-film forming process, wherein the preliminary-film forming process is for filtrating the mixing solution and then remaining a mixture of the graphene oxides and the nano initial hybrid structures to form a preliminary film; and providing a heating process, wherein the heating process is for heating the preliminary-film to reduce the graphene oxides as a plurality of reduced graphene oxides and convert the polydopamine layers into a plurality of carbon layers, so as to convert the nano initial hybrid structures into a plurality of nano hybrid structures;

whereby, the high thermal conductive hybrid film is formed.

2. The manufacturing method of the high thermal conductive hybrid film of claim 1, wherein in the preliminary-film forming process, the mixture of the graphene oxides and the nano initial hybrid structures is pressurized and dried in air to form the preliminary-film.

3. The manufacturing method of the high thermal conductive hybrid film of claim 2, wherein in the heating process, the preliminary-film is disposed in a high-temperature furnace with argon flowing at 800° C. to anneal.

* * * * *